(12) United States Patent
Alexander et al.

(10) Patent No.: US 9,467,298 B1
(45) Date of Patent: Oct. 11, 2016

(54) DEVICE FOR AND METHOD OF MULTILEVEL CHAIN OF TRUST/REVISION

(71) Applicant: National Security Agency, Ft. George G. Meade, MD (US)

(72) Inventors: Keith B. Alexander, Ft. George G. Meade, MD (US); Patrick W. Dowd, Annapolis, MD (US)

( * ) Notice: Subject to any disclaimer, the term of this patent is extended or adjusted under 35 U.S.C. 154(b) by 223 days.

(21) Appl. No.: 13/999,545

(22) Filed: Mar. 19, 2014

(51) Int. Cl.
| H04L 9/32 | (2006.01) |
| H04L 29/06 | (2006.01) |
| H04L 9/30 | (2006.01) |

(52) U.S. Cl.
CPC ............... *H04L 9/3265* (2013.01); *H04L 9/30* (2013.01); *H04L 9/3247* (2013.01); *H04L 63/0823* (2013.01)

(58) Field of Classification Search
CPC ... H04L 63/0823; H04L 9/3247; H04L 9/30; H04L 9/3263–9/3268
See application file for complete search history.

(56) References Cited

U.S. PATENT DOCUMENTS

| 6,134,550 | A  * | 10/2000 | Van Oorschot | G06F 21/33 |
| 6,816,900 | B1 * | 11/2004 | Vogel | H04L 9/3236 |
| | | | | 709/203 |
| 7,275,155 | B1 | 9/2007 | Aull | |
| 7,747,852 | B2 | 6/2010 | Aull | |
| 8,510,859 | B2 | 8/2013 | Zimmer et al. | |
| 8,621,222 | B1 * | 12/2013 | Das | H04L 9/321 |
| | | | | 713/168 |
| 8,677,466 | B1 * | 3/2014 | Chuang | H04L 9/321 |
| | | | | 709/229 |
| 8,954,732 | B1 * | 2/2015 | Watsen | H04L 9/3263 |
| | | | | 713/157 |
| 2001/0005841 | A1 * | 6/2001 | Wray | G06Q 20/3821 |
| | | | | 705/76 |
| 2002/0161721 | A1 * | 10/2002 | Yuan | G06Q 20/04 |
| | | | | 705/65 |
| 2004/0083359 | A1 * | 4/2004 | Camus | H04L 9/3273 |
| | | | | 713/156 |
| 2005/0132202 | A1 * | 6/2005 | Dillaway | H04L 9/0825 |
| | | | | 713/179 |
| 2008/0010448 | A1 | 1/2008 | Sabnis et al. | |
| 2008/0046758 | A1 * | 2/2008 | Cha | G06F 21/57 |
| | | | | 713/189 |
| 2008/0301439 | A1 * | 12/2008 | Hashimoto | H04L 63/06 |
| | | | | 713/156 |
| 2008/0313712 | A1 | 12/2008 | Ellison et al. | |
| 2009/0049309 | A1 * | 2/2009 | Brinker | G06F 21/57 |
| | | | | 713/189 |
| 2009/0070591 | A1 | 3/2009 | Keohane et al. | |
| 2009/0259854 | A1 | 10/2009 | Cox et al. | |
| 2010/0048296 | A1 | 2/2010 | Adiraju | |
| 2010/0121928 | A1 * | 5/2010 | Leonard | H04L 63/1433 |
| | | | | 709/206 |
| 2010/0138907 | A1 | 6/2010 | Grajek et al. | |
| 2011/0119390 | A1 | 5/2011 | Leech et al. | |
| 2011/0184910 | A1 * | 7/2011 | Love | G06F 17/30551 |
| | | | | 707/610 |
| 2012/0163589 | A1 | 6/2012 | Johnson et al. | |
| 2013/0191643 | A1 | 7/2013 | Song et al. | |
| 2014/0068251 | A1 * | 3/2014 | Ignaci | H04L 9/006 |
| | | | | 713/158 |
| 2014/0304515 | A1 * | 10/2014 | Feuerman | H04L 63/123 |
| | | | | 713/176 |

FOREIGN PATENT DOCUMENTS

WO 2012/082410 A2 6/2012

OTHER PUBLICATIONS

Hural et al., "Authorization through Trust Chains in Ad hoc Grids", Jun. 3-5, 2009, ACM, pp. 1-4.*

* cited by examiner

*Primary Examiner* — Matthew Smithers

(57) ABSTRACT

A device and method of multilevel chain of trust/revision by certifying each user, device, action, and circumstance in the creation, modification, and transmission of computer information, including a revision history of any modification.

12 Claims, 5 Drawing Sheets

DEVICE FOR AND METHOD OF MULTILEVEL CHAIN OF TRUST/REVISION

CROSS-REFERENCE TO RELATED APPLICATIONS

The present invention is related to U.S. patent application Ser. No. 13/999,546, entitled "Device and Method of Controlled Multilevel Chain of Trust/Revision," filed Mar. 19, 2014.

FIELD OF THE INVENTION

The present invention relates, in general, to electrical computers and digital processing systems support and, more particularly, to chain or hierarchical security certificates.

BACKGROUND OF THE INVENTION

X.509 is an International Telecommunication Union (ITU) standard for public key infrastructure (PKI) and privilege management infrastructure (PMI). X.509 specifies a public key certificate for cryptographically binding a digital signature of a certification authority to a particular public key of a particular user so that the public may be assured, via the digital signature of the certifying authority, that a message encrypted using the public key of the particular user may be decrypted by the user's private key (hopefully, only by the particular user), and that a message that can be decrypted using the particular public key came from someone possessing the corresponding private key (hopefully, only the particular user). X.509 is described in Request for Comment 5280 (RFC 5280) of the Internet Engineering Task Force organization.

X.509 includes two extensions described in RFC 3779. The first extension binds a digital signature of a certification authority to a list of Internet Protocol (IP) addresses (e.g., a set of personal computing devices). The second extension binds a digital signature of a certification authority to an Autonomous System (AS) number (i.e., a set of routers).

The theory employed by the prior art digital certificates is that an electronic communication encrypted using a public key bound to a digital signature of a certification authority has not been altered (e.g., is free from malicious code) prior to encryption. The theory is based on the assumption that a user starts with electronic information (e.g., a computer program) that has not been altered. If a user encrypts unaltered information using public key cryptography then the recipient of the encrypted information is reasonably assured that the information has not been altered during transmission. If the assumption is not correct then using public key cryptography to encrypt and transmit the altered information will not protect a recipient from the effects of the altered information. Extending the X.509 certification process to a set of IP addresses or a set of routers also does not protect a recipient against the effects of information that was altered prior to encryption and transmission.

The X.509 certificates have been used in serial fashion by multiple certification authorities to form a chain of trust. That is, a public key bound to a digital signature of a root certification authority is used by a first user to communicate with a second user. The second user modifies the information received and either self certifies the modification (i.e., the second user's digital signature is bound to the second user's public key) or gets a second certification authority to do so and sends the second certified information to a third user along with the root certification so that the third user may verify the chain of certificates back to the root certifying authority. If there is a break in the chain of the certifications then the communication is not trusted (i.e., it is assumed that it has been altered by an unauthorized entity). While the chain of authority certifications give some assurance that the transmissions were not altered by an unauthorized entity they still do not guarantee that the users started with information that was not altered by an unauthorized user or that would not be altered in an unwanted way during use of the information.

There is a need for a chain-of-trust certification device and method that enables detection of unauthorized alteration of electronic information at more than just the encryption and transmission levels and indicates whether any revisions were made to the electronic information. The present invention is such a device and method.

U.S. Pat. Nos. 7,275,155 and 7,747,852, both entitled "CHAIN OF TRUST PROCESSING," discloses a method of using a first certificate to obtain another certificate to establish a train of trust. U.S. Pat. Nos. 7,275,155 and 7,747,852 are incorporated by reference into the specification of the present invention.

U.S. Pat. No. 8,510,859 entitled "METHODS AND ARRANGEMENTS TO LAUNCH TRUSTED, CO-EXISTING ENVIRONMENTS," discloses a method of launching trusted environments by comparing integrity metrics for the runtime environment of an embedded partition against integrity metrics for a trusted runtime environment of the embedded partition. U.S. Pat. No. 8,510,859 is incorporated by reference into the specification of the present invention.

U.S. Pat. Appl. Pub. No. 20080010448 entitled "DELEGATED CERTIFICATE AUTHORITY," discloses a method of generating a digital certificate that includes a common name field and a distinguished field name for identifying a plurality of resources in the certification path between the trusted root resource and the resource issuing the digital certificate. U.S. Pat. Appl. Pub. No. 20080010448 is incorporated by reference into the specification of the present invention.

U.S. Pat. Appl. Pub. No. 20090259854 entitled "METHOD AND SYSTEM FOR IMPLEMENTING A SECURE CHAIN OF TRUST," discloses a device for and method of authenticating less-secure boot code using a secret key. U.S. Pat. Appl. Pub. No. 20090259854 is incorporated by reference into the specification of the present invention.

U.S. Pat. Appl. Pub. No. 20080313712 entitled "TRANSFORMATION OF SEQUENTIAL ACCESS CONTROL LISTS UTILIZING CERTIFICATES," discloses a device for and method of mapping an access policy as expressed in an access control list to a set of certificates. U.S. Pat. Appl. Pub. No. 20080313712 is incorporated by reference into the specification of the present invention.

U.S. Pat. Appl. Pub. No. 20090070591 entitled "GRID MUTUAL AUTHORIZATION THROUGH PROXY CERTIFICATE GENERATION," discloses a device for allowing a primary resource to offload a grid computing job to a secondary resource if the user machine and the primary resource mutually authenticate the secondary resource. U.S. Pat. Appl. Pub. No. 20090070591 is incorporated by reference into the specification of the present invention.

U.S. Pat. Appl. Pub. No. 20100048296, entitled "RESOURCE VALIDATION," discloses a device for and method of validating a digital certificate that was generated using an access key stored within the basic input/output system (BIOS) of the machine that generated the certificate.

U.S. Pat. Appl. Pub. No. 20100048296 is incorporated by reference into the specification of the present invention.

U.S. Pat. Appl. Pub. No. 20110119390, entitled "SELECTIVELY RE-MAPPING A NETWORK TOPOLOGY," discloses a device for and method of selectively re-mapping a network topology based on information in a user profile. U.S. Pat. Appl. Pub. No. 20110119390 is incorporated by reference into the specification of the present invention.

U.S. Pat. Appl. Pub. No. 20100138907, entitled "METHOD AND SYSTEM FOR GENERATING DIGITAL CERTIFICATES AND CERTIFICATE SIGNING REQUESTS," discloses a device for and a method of issuing digital certificates and signing the certificate request with a trusted root chain associated with the network resource. U.S. Pat. Appl. Pub. No. 20100138907 is incorporated by reference into the specification of the present invention.

U.S. Pat. Appl. Pub. No. 20130191643, entitled "ESTABLISHING A CHAIN OF TRUST WITHIN A VIRTUAL MACHINE," discloses a device for and a method of establishing a chain of trust in a virtual machine by generating a trust anchor by measuring an immutable portion of a virtual machine image configured to instantiate as the virtual machine. U.S. Pat. Appl. Pub. No. 20130191643 is incorporated by reference into the specification of the present invention.

SUMMARY OF THE INVENTION

It is an object of the present invention to combine both authentication and authorization with public key cryptography, certification authority, and authorization.

It is another object of the present invention to enable detection of unauthorized alteration of electronic information at multiple cyber activity levels via a chain of trust.

It is another object of the present invention to enable certification of multiple aspects of cyber activity, including equipment, application, user, activity, and location.

It is another object of the present invention to enable certification of revisions made to electronic information, including authentication of an entity (e.g., a computer object) and authorization of an action concerning the entity.

The present invention is a device that implements a method of multilevel chain of trust/revision. The first step of the method is a first user requesting certification from a certification authority of a characteristic including user, device, location, information, activity, circumstance, and communication to ensure that the requestor has the authority to request, and is authorized to receive, a computing object.

The second step of the method is a certification authority receiving a certification request from the first user, comparing it against certification criteria and, if the criteria are satisfied, issuing a certificate to the first user.

The third step of the method is the first user contacting a computing device for a computer object.

The fourth step of the method is the computing device contacting the certification authority for verification that the first user is authorized to receive the computer object and use it for a particular purpose, which provides additional security over prior art certification devices and methods. In the present invention, verification includes authentication of various entities (e.g., data, function, a user, a computing device, etc.) and authorization of an entity (e.g., authorization to use data for a particular purpose and under a particular circumstance, authorization to use a computing device, etc.), which adds functionality over prior art certification devices and methods.

The fifth step of the method is the certification authority verifying to the computing device that the first user is authorized to receive the computer object or not.

The sixth step of the method is the computing device sending the first user the computer object if the first user is authorized to receive the computer object.

The seventh step of the method is the first user getting the computer object and executing it, including a digital certification of a communication with a subsequent user, of a modification of a previous communication, and all previous certificates associated with the communication.

The eighth step of the method is a subsequent user contacting the certification authority for verification that the subsequent user is authorized to process the communication.

The ninth step of the method is the certification authority providing the subsequent user with a certificate to process the communication if authorized to do so.

The tenth step of the method is the subsequent user processing the received communication if authorized to do so, including modifying the communication and further communicating it to another user in accordance with the first through the tenth steps described above, and including all of the certificates associated with each communication for a chain of trust/revision in each user, device, operation, operation, circumstance, and modification associated with the communication.

DETAILED DESCRIPTION OF THE PREFERRED EMBODIMENT

The present invention is a device for and method of multilevel chain of trust/revision.

Many prior art applications do not verify that a computer object was loaded into memory correctly or that such loading should take place at all. The present invention expands the use of certification as compared to the prior art to provide both authentication and context based authorization to establish a chain of trust/revision for developing, compiling, integrating, testing, distributing, administrating, updating, installing, and executing a computer program. Chain of trust/revision guards against unauthorized modifications (e.g., malware), supply/transmission line interruptions, unauthorized access, and unauthorized activity by requiring certification of every aspect of the creation of software, the modification of software, the use of software, the devices on which the software is used, the entity that wants to use the software, and the circumstance under which the software is used, which is far beyond what prior art certification methods and device presently do.

Figure 1:
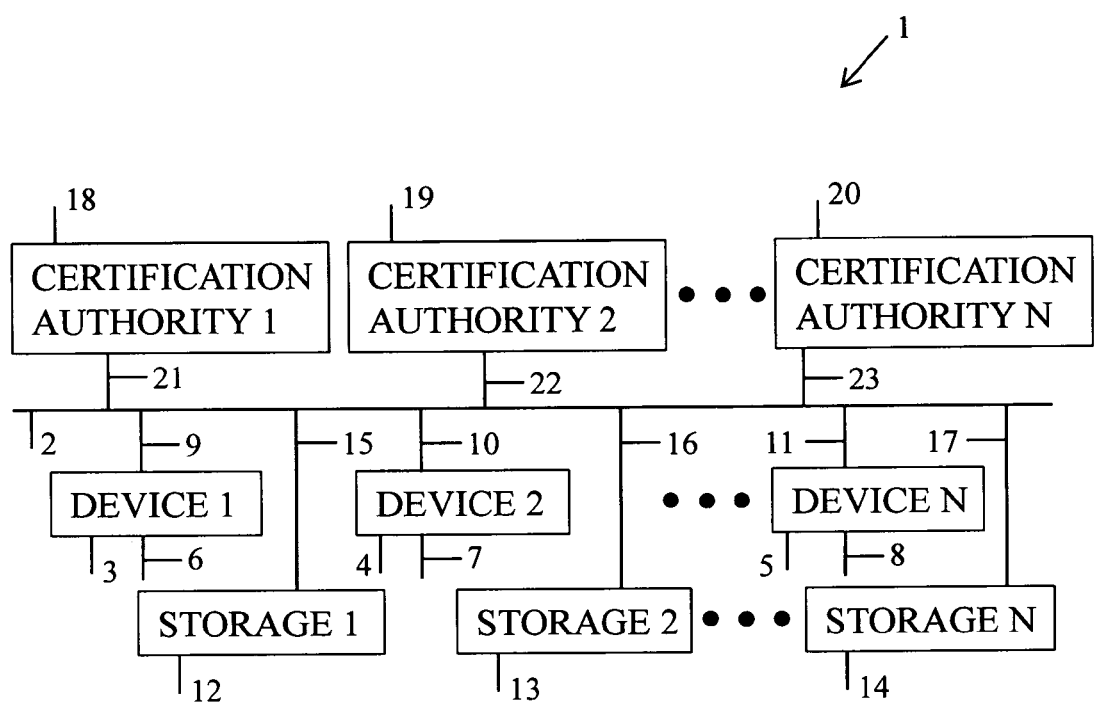
FIG. 1 is a schematic of the device of the present invention.

FIG. 1 is a schematic of the device 1 of the present invention.

The device 1 includes a bus 2.

The device 1 also includes at least one computing device 3, 4, 5. Each computing device 3, 4, 5 has an input 6, 7, 8 for receiving input from a user (e.g., a first user, a subsequent user, etc.). Each computing device 3, 4, 5 also has an input/output bus 9, 10, 11 connected to the bus 2 for requesting certification of a certifiable characteristic. In the preferred embodiment, certifiable characteristics include authorization for a user (e.g., User A), a computing device (e.g., User A's mobile phone), a location (e.g., a geolocation of a computing device), accessing a computing object (e.g., User A's electronic medical records), an activity (e.g., downloading), a circumstance (e.g., normal business hours), a communication (e.g., sending a message to User B), receiving a certificate authorizing access to a computer object, sending a computer object to another at least one computing device, executing a computer object, modifying a computer object, modifying a communication, and sending a communication and all of its associated certificates to another at least one computing device. In the preferred embodiment, each at least one computing device 3, 4, 5 is selected from the group of computing devices consisting of a computer, a personal digital assistance, and a mobile device. In the preferred device 1, location includes a geolocation and a location in a network topology (e.g., the center device in a star topology). Access for which a computing device 3, 4, 5 may be authorized include access to data, software, and a computer library.

An activity for which a computing device may be authorized includes developing a computer program, compiling a computer program, distributing a computer program, updating a computer program, installing a computer program, and executing a computer program, where executing a computer program includes all sub-activities associated with executing a computer program.

Roles and activities of the users are certified and are authorizable in addition to being authenticated, where an activity within the scope of a user's role may be denied certification if the circumstances surrounding the activity are sufficiently questionable (e.g., activity requested from prohibited device, prohibited location, prohibited time, etc.). Circumstance that are authorized include circumstances that are appropriate, normal, reasonable, prudent, and expected in a situation (e.g., User A's doctor requesting User A's medical records at the doctor's office during office hours). Users may be on different computing systems (e.g., Internet, mobile devices, personal digital assistance, etc.) at any location, so long as the location is certified for use.

White lists (allowed activities) and black lists (unauthorized activities) may be used to certify an activity or not. Attributes denoting the set of authorizations allowed to an entity are cryptographically bound to that entity's public key.

Additionally, circumstances considered before authorizing an activity include location (e.g., geolocation, network location), last location, and last activity.

The device 1 also includes at least one storage device 12, 13, 14 in which computer objects are stored. Each at least one storage device 12, 13, 14 has an input/output 15, 16, 17 connected to the bus 2. In the process of developing a computer program, a user may require a computer object (e.g., data, a subroutine, a library, a computer program, etc.) from another device. The user would first request authorization from a certification authority to receive the computer object. If the user is approved to use the computer object, the certification authority would send the user a digital certificate. The user would then request the computer object from the device on which the computer object is stored. The device on which the computer object is stored would then ask the certification authority if the user requesting the computer object is authorized to receive it on the device from which the request was made. If the certification authority informs the holder of the computer object that the user requesting the computer object is authorized to receive it on the user's computing device then the holder of the computer object sends it to the user's device. Constraints may be placed on the transmission of the computer object (e.g., transmission time, available for use within a certain time, etc.). In-band objects (i.e., objects in the payload) and out-of-band objects (i.e., objects elsewhere) may be used. Different forms of transmission (e.g., FTP, HTTP) are certifiable.

Computer objects also include header files and procedure files. Computer objects are certified when created, compiled, and executed to maintain a chain of trust/revision at every step in a process.

The device 1 also includes at least one certification authority 18, 19, 20 for receiving each certification request from at least one computing device and comparing the certification request against user-definable criteria for certifying the certification request and, if the criteria are satisfied, issuing to the at least one computing device a certificate authorizing the request and doing the same if the request is for a computer object stored in at least one storage device. Each at least one certification authority 18, 19, 20 has an input/output 21, 22, 23 connected to the bus 2. In the preferred embodiment, the certificate issued by the at least one certification authority 18, 19, 20 is a digital certificate sufficient for the intended purpose. Examples of digital certificates include a PKI certificate, an X.509 certificate, a Secure Socket Layer certificate, and an IPSec certificate.

Any connection in the device 1 is either a direct connection (e.g., a hardwired or radio frequency (RF) connection directly between the components being connected) or an indirect connection, where an indirect connection is one that includes one or more intermediary devices between the components being connected, where an intermediary device transfers the information to be transferred via the connection without modifying the information being transferred.

Figure 2A:
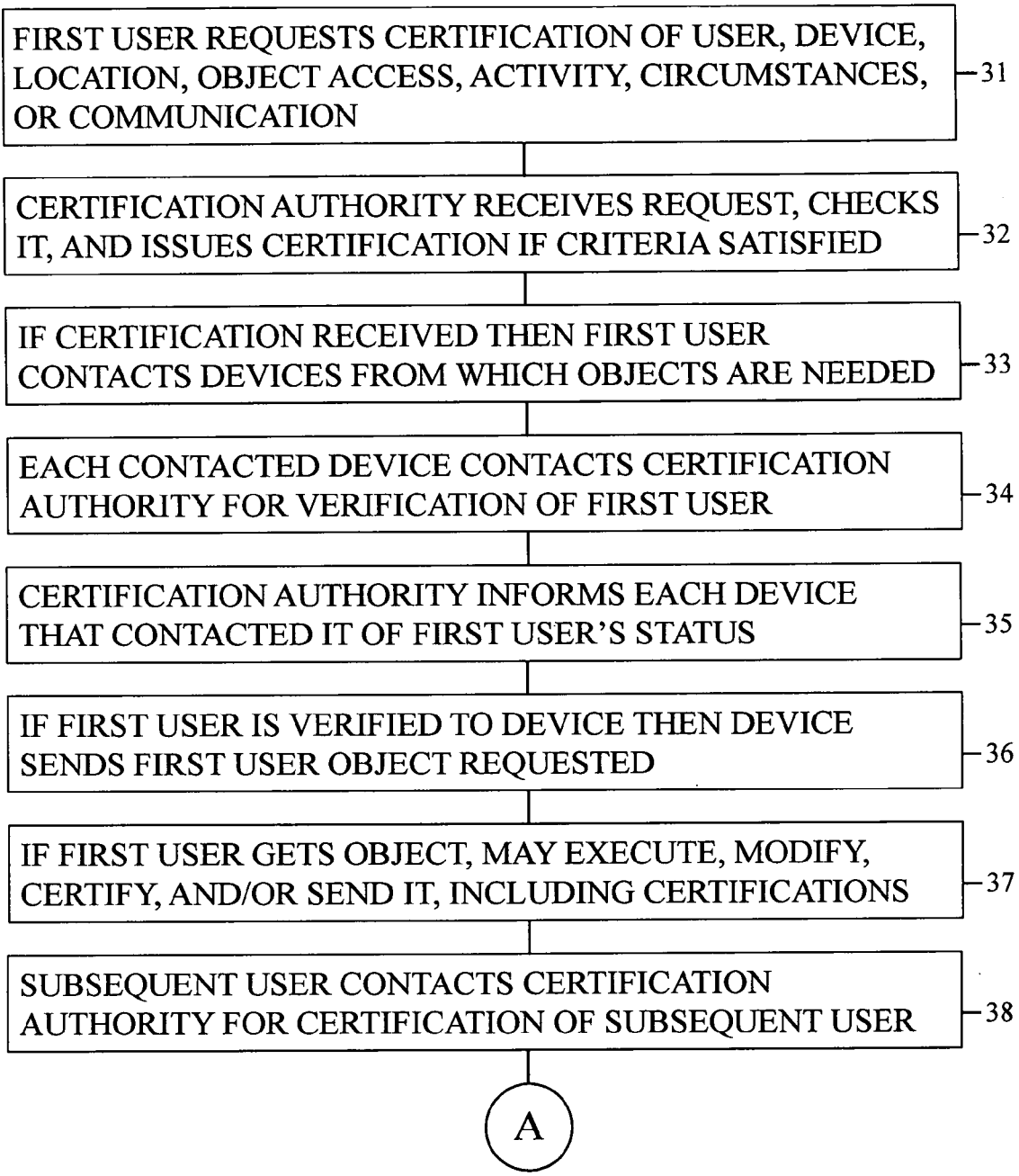
FIGS. 2A-2B depict a flowchart of the steps of the method of the present invention.
Figure 2B:
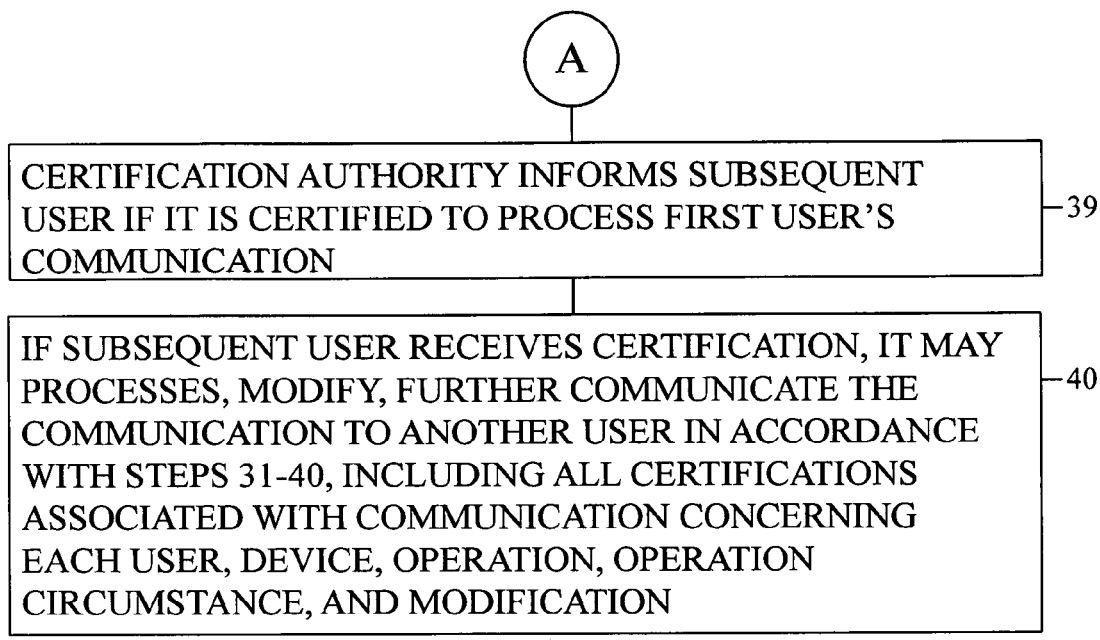

FIGS. 2A and 2B depict a flow chart of the method of multilevel chain of trust/revision.

The first step 31 of the method is a first user requesting, via the first user's computing device, certification of a certifiable characteristic. In the preferred embodiment, certifiable characteristics include user, computing device, location, access to a computing object, an activity, a circumstance, and a communication. In the preferred embodiment, the certification is a digital certificate sufficient for the intended purpose. Examples of digital certificates include a PKI certificate, an X.509 certificate, a Secure Socket Layer certificate, and an IPSec certificate. The preferred computing device is a computer, a personal digital assistance, or a mobile device. Certifiable location includes a geolocation or a location within a computer network topology (e.g., a center device in a star topology). The type of computer objects that may be certified include data, software, and a library. Activities that may be certified include developing a computer program, compiling a computer program, distributing a computer program, updating a computer program, installing a computer program, and executing a computer program, where executing a computer program includes all sub-activities associated with executing a computer program. Certifiable circumstances include circumstances that are appropriate, normal, reasonable, prudent, and expected for the situation. For example, a common activity, done to a reasonable extent, during normal business hours from a typically used device at a typically used location would probably be certified, whereas a common activity, done in the middle of the night, from an unfamiliar device, from an unfamiliar location would probably not be certified.

Operations that may be authorized/certified include merging digital information, transferring digital information, replicating digital information, and modifying digital information. When a user modifies digital information, the user transmits not only a digitally signed version of the modified information and/or a pointer to the modified information but also a digital signature of the unmodified information. The function used to modify the information is also identified so that it may be verified that the modification was made correctly. The information contained in the transmission establishes a chain of custody and revision between the original information and any modification to it. The first signed information establishes the beginning point or root of the chain of trust/revision. The user, or a subsequent user, if authorized to do so, may make further modifications to information received. Appropriate digital signatures as described above must be included to maintain the chain of trust/revision. If a function F is used to merge/combine computer objects A and B to form computer object C then information that preserves the chain of trust/revision will include C, a pointer to A, a digital signature/certificate for A, a pointer to B, a digital signature/certificate for B, and a digital signature/certificate for C. For example, a first user may be authorized to access a first data item, access a second data item, and use a first function A second user may be authorized to access the second data item and use a second function. Therefore, the first user could only perform the first function on the first data item, the second data item, and a combination of the first data item and the second data item. The first user could not use the second function. The second user could only perform the second function on the second data item. The second user could not access the first data item or use the first function.

The second step 32 of the method is receiving by a certification authority each certification request from the first user and comparing it against user-definable criteria for certifying the request and, if the criteria are satisfied, issuing to the first user a certificate authorizing the request.

The third step 33 of the method is if the first user receives a certificate from the certification authority authorizing the activity in question then contacting by the first user each computing device from which a computer object is required in order to conduct the activity.

The fourth step 34 of the method is contacting the certification authority by each computing device that receives a request from the first user for a computer object for verification that the first user is authorized to receive the computer object and proceeding to the next step.

The fifth step 35 of the method is if a certification authority receives a request from a computing device for verification that the first user is authorized to receive a computer object then informing the computing device by the certifying authority if the first user is authorized to receive the computer object and proceeding to the next step.

The sixth step 36 of the method is if a computing device receives verification from the certifying authority that the first user is authorized to receive a computer object in possession of the computing device then sending by the computing device the first user the computer object and proceeding to the next step.

The seventh step 37 of the method is if the first user receives the computer objects required to execute the object of the first user's request then executing the object, where the result includes a digital certification of the result by the first user if the object is communicating with a subsequent user, where the object includes modifying a previous communication, where the communication includes all previous certificates associated with the communication, and proceeding to the next step for additional communications, otherwise stopping.

The eighth step 38 of the method is contacting the certification authority by the subsequent user that receives a communication from the first user for verification that the subsequent user is authorized to process the communication and proceeding to the next step.

The ninth step 39 of the method is if a certification authority receives a request from a subsequent user for verification that the subsequent user is authorized to process the received communication then providing the subsequent user with a certificate to process the received communication if authorized to do so and proceeding to the next step.

The tenth step 40 of the method is if the subsequent user receives verification from the certifying authority that the subsequent user is authorized to process the received communication then processing the received communication, which includes modifying the communication and further communicating it to another user in accordance with the first step 31 through the tenth step 40, including all of the certificates associated with each communication for a chain of trust/revision in each user, device, operation, circumstance, and modification associated with the communication.

One application of the present invention is when a User A develops a computer program code on a computing device X, where the computer program may include signed computer programs or signed libraries (e.g., Github for distributed, collaborative code development). User A digitally signs and transmits the computer program to a User B, where User B is working on a computing device Y. User B digitally signs and transmits the computer program to a User C, where User C is working on a computing device Z, and where User C may transmit User's A's computer program, unmodified or modified, and/or a new computer program developed by User C. If public key cryptography is used to digitally sign/certify digital information included in an electronic transmission and all of the digital signatures/certificates associated with the digital information are included then chain of custody and chain of revision/pedigree is established. That is, each recipient of digital information may determine from where/whom the information originally came and, if any modification was made to it along the way, who made the modification and what modification was made. If at any point either chain is broken, returning to the point just before the break reestablishes the chains of custody and revision.

Another application of the present invention is when User A develops a computer program on device A but executes it on device B. While executing the computer program, device B links the computer program to another signed computer program and/or a signed call function. Some of the execution of the computer program may take place in a Trusted Platform Module on a device C. Such operations may continue recursively if any other levels of indirection are present.

An example of the present invention includes an information object transiting from its originator (e.g., one platform) to a consumer (e.g., another platform) via multiple intermediate nodes. The intermediate nodes might not merely forward the information object as would a communication network but may also perform an operation or modification on the information object, altering it in some manner. The device and method and of the present invention enables the consumer to understand the operation history or pedigree of the information object from the originator to the consumer for providing not just a chain of trust from the originator to the consumer but also allowing the information object to be modified only in a manner that preserves the chain of trust and identifies the entities that caused the modifications.

Figure 3:
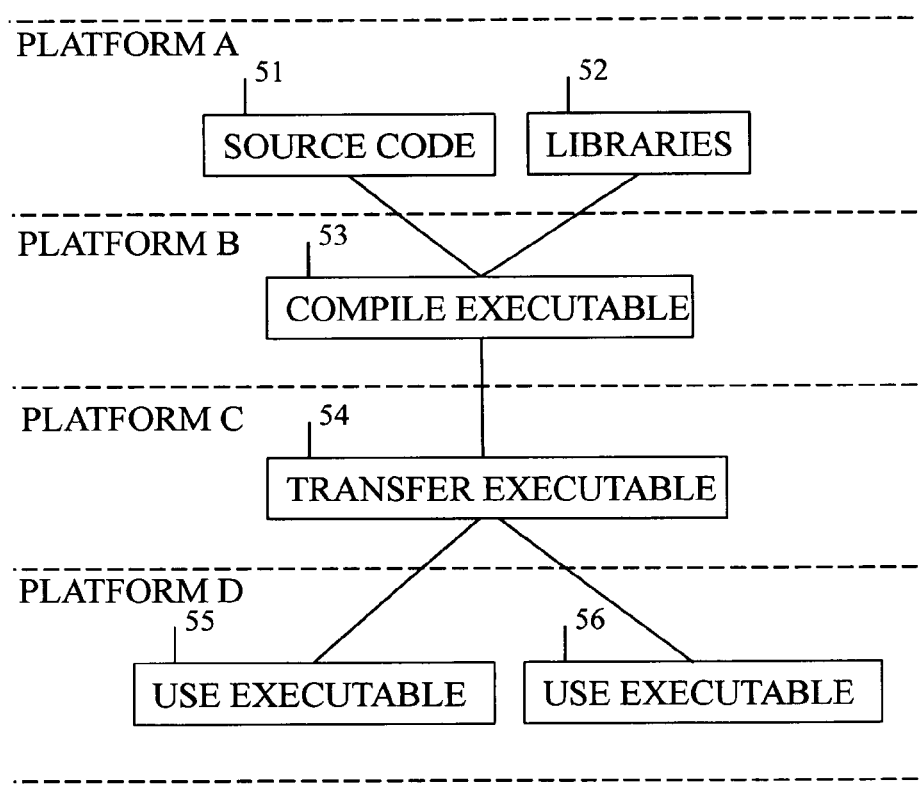
FIG. 3 is an illustration of a first example of the present invention.

FIG. 3 is a first example of the present invention as it applies to a software development, where a software developer develops source code 51 on one platform (e.g., platform A) that uses at least one library 52, which may also be on the same platform. The first operation on the source code 51 and the at least one library 52 is compiling the source code 51 into executable code 53 via a compiler so that the executable code includes links to the at least one library 52. The compilation operation may be conducted on another platform (e.g., platform B). Entities involved with this activity are the data objects (i.e., the source code 51 and the at least one library 52), necessary analytic functions (e.g., a compiler), and one or more computer operating systems or platforms (e.g., one for creating the source code 51, one for compiling the source code 51, at least one to which the executable code would be distributed). The source code 51 is transformed into executable code 53 and forwarded to a server 54 for distribution, which may be on yet a further platform (e.g., platform C). Operating systems 55, 56 on yet another platform (e.g., platform D) receive the executable code 53 distributed by the server 54. The operating systems 55, 56 use the executable code 53 by decomposing it and the at least one library 52 that was dynamically linked to it into pages, decomposes the pages into cache lines, and executing the cache lines on the platforms microprocessor (not shown).

Authentication and integrity in the example of FIG. 3 is provided via a public key infrastructure, where each data object is cryptographically signed. Authorization is achieved by an authorization service that contains the characteristic attributes of each entity such as the set of operations an entity is empowered to invoke, where the authorization server defines the set of operations (analytic functions) that may be applied to the date objects based on a specific set of platforms and users in question. Certain platforms may be designated to host certain applications (e.g., a platform for processing a company's human resources information might not be authorized to transfer data to the public). Similarly, the authorization attributes assigned to a user define the specific operations the user may invoke. Analytic functions, compilers for example, may be authorized for specific data entities and platforms. Similarly, platforms may be authorized for the data entities and the analytic functions that may be executed by it. A set or tuple of data objects, function, platform, and user (i.e., (data objects, function, platform, user)) may be mutually authorized and authenticated at each stage at which an operation is requested. Context is defined as the relationship between a particular tuple and a particular operation requested.

Figure 4:
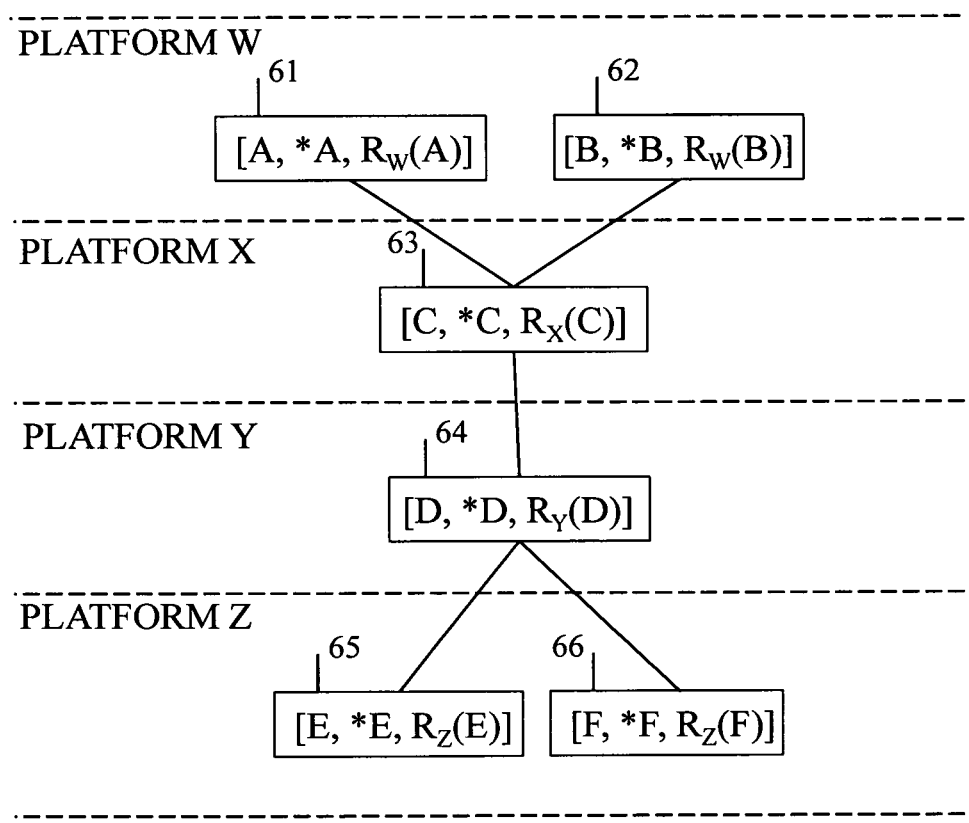
FIG. 4 is an illustration of a second example of the present invention.

FIG. 4 is a second example of the present invention that illustrates merge, transfer, and replicate/mutate operations. FIG. 4 illustrates the ability to determine chain of trust in both the forward and backward direction in order to determine if and where the chain of trust is broken. When a chain of trust is broken, the present invention allows a user to return to the point just before the chain of trust was broken and continue processing from there, where prior art methods and devices cannot.

A first data object A is created on a platform W. Data object A is represented by a tuple [A, *A, $R_W(A)$] 61, where A is the actual data object A, *A is a pointer to a data structure that indicates what data objects, if any, were used to create A, and where $R_W(A)$ is a digital signature of A that was signed by W.

If A was created on W without using any other data object with which a tuple is associated then *A is null. If A was created on W using another data object with which a tuple is associated (i.e., A is a user-definable function of the other data object) then *A is a pointer to a data structure that contains the tuple associated with the other data object (e.g., ([G, *G, $R_K(G)$])), where G was formed on entity K), where A is then a mutation of the other data object. If A was created on W using more than one other data object (i.e., A is a user-definable function of the other data objects) then *A is a pointer to a data structure that contains a list of the tuples associated with the other data objects used to form A (e.g., ([G, *G, $R_K(G)$], [H, *H, $R_L(H)$]), where H was created on entity L), where A is then a mutation of each data object used to form A. An original data object that has not been mutated may be mutated, and a data object that has been mutated may be further mutated. In FIG. 4, A was created on W without using any other data object. So, *A is null.

$R_W(A)$=g(PrW, A), where g is a reversible cryptographic function that uses PrW and A, where PrW is a private cryptographic key associated with W, and where $R_W(A)$ may be reversed by multiplying it by PuW, where PuW is a public cryptographic key associated with W. Rw(A) indicates to a user of A that W trusted it and that a user of A may trust it and, therefore, acts as a root of trust for A.

A second data object B is created on a platform W. Data object B is represented by a tuple [B, *B, $R_W(B)$] 62, where B is the actual data object B, *B is a pointer to a data structure that indicates what data objects, if any, were used to create B, and where $R_W(B)$ is a digital signature of B that was signed by W.

B may be created in the same ways that A may be created. In FIG. 4, B was created on W without using any other data object. So. *B is null.

$R_W(B)$=g(PrW, B), where g is a reversible cryptographic function that uses PrW and B, where PrW is a private cryptographic key associated with W, and where $R_W(B)$ may be reversed by multiplying it by PuW, where PuW is a public cryptographic key associated with W. $R_W(B)$ indicates to a user of B that W trusted it and that a user of B may trust it. When a data object (e.g., A) is created without using any other data object then its signature (e.g., $R_W(A)$) is referred to as the root of trust, because it signifies that the object (e.g., A) was trusted upon its creation or at its source.

Platform X received tuples [A, *A, $R_W(A)$] 61 and [B, *B, $R_W(B)$] 62 and created data object C from them using a user-definable function (e.g., C=m(A,B), where m is a user-definable mapping function). A tuple that represents C is [C, *C, $R_X(C)$] 63, where C is the actual data object C, *C is a pointer to a data structure that lists the tuples for A and B (i.e., ([A, *A, $R_W(A)$] 61, [B, *B, $R_W(B)$] 62)), and where $R_X(C)$ is a digital signature of C that was signed by X.

$R_X(C)$=g(PrX, C), where g is a reversible cryptographic function that uses PrX and C, where PrX is a private cryptographic key associated with X, and where $R_X(C)$ may be reversed by multiplying it by PuX, where PuX is a public cryptographic key associated with X. $R_X(C)$ indicates to a user of C that X trusted it and that a user of C may trust it.

Since $R_X(C)$ is a signature of a data object (i.e., C) that was created using other data objects (i.e., A and B) then it is not a root of trust but provides sufficient information in its tuple for a user to identify each data object that was used to create C and to determine if those data objects were trusted (i.e., have signatures associated with them). Since $R_W(A)$ and $R_W(B)$ are roots of trust for A and B, respectively, then checking for their existence informs a user that all of the data objects used are trusted. (i.e., no modifications were made to the objects after they were created). If a user finds that an object was not trusted (i.e., not signed) then the user should not trust/use the object. The present invention informs a user that the data objects are trusted and not modified after creation or not.

Platform Y received tuple [C, *C, $R_X(C)$] 63 and created data object D from it using a user-definable function (e.g., D=m(C), where m is a user-definable mapping function). A tuple that represents D is [D, *D, $R_Y(D)$] 64, where D is the actual data object D, *D is a pointer to a data structure that identifies the tuple for C (i.e., ([C, *C, $R_X(C)$] 63), and where $R_Y(D)$ is a digital signature of D that was signed by Y.

$R_Y(D)$=g(PrY, D), where g is a reversible cryptographic function that uses PrY and D, where PrY is a private cryptographic key associated with Y, and where $R_Y(D)$ may be reversed by multiplying it by PuY, where PuY is a public cryptographic key associated with Y. $R_Y(D)$ indicates to a user of D that Y trusted it and that a user of D may trust it.

Since $R_Y(D)$ is a signature of a data object (i.e., D) that was created using an other data object (i.e., C, which was created using data objects A and B) then it is not a root of trust but provides sufficient information in its tuple for a user to identify the data object that was used to create D and to determine if the data object was trusted (i.e., has a signature associated with it). It also provides sufficient information to determine what data objects were used to create C. Since $R_X(C)$ is not a root of trust, a user could follow the chain of tuples all the way back to the roots of trust for the data objects used to determine if all of the objects used were trusted (i.e., were signed) and, if so, trust that no modifications were made to the objects after they were created. The present invention informs a user that all data objects were trusted and not modified after creation or not.

Platform Z received tuple [D, *D, $R_Y(D)$] 64 and created data objects E and F from it using user-definable functions (e.g., E=$m_2$(D), F=$m_3$(D), where $m_2$ and $m_3$ are user-definable mapping functions that may be the same or different from each other and may be the same or different from m described above). A tuple that represents E is [E, *E, $R_Z(E)$] 65, where E is the actual data object E, *E is a pointer to a data structure that identifies the tuple for D (i.e., ([D, *D, $R_Y(D)$] 64), and where $R_Z(E)$ is a digital signature of E that was signed by Z. A tuple that represents F is [F, *F, $R_Z(F)$] 66, where F is the actual data object F, *F is a pointer to a data structure that identifies the tuple for D (i.e., ([D, *D, $R_Y(D)$] 64), and where $R_Z(F)$ is a digital signature of F that was signed by Z.

$R_Z(E)$=g(PrZ, E), where g is a reversible cryptographic function that uses PrZ and E, where PrZ is a private cryptographic key associated with Z, and where $R_Z(E)$ may be reversed by multiplying it by PuZ, where PuZ is a public cryptographic key associated with Z. $R_Z(E)$ indicates to a user of E that Z trusted it and that a user of E may trust it. $R_Z(F)$=g(PrZ, F), where g is a reversible cryptographic function that uses PrZ and F, where PrZ is a private cryptographic key associated with Z, and where $R_Z(F)$ may be reversed by multiplying it by PuZ, where PuZ is a public cryptographic key associated with Z. $R_Z(F)$ indicates to a user of F that Z trusted it and that a user of F may trust it.

Since $R_Z(E)$ and $R_Z(F)$ are signatures of data objects (i.e., E and F) that were created using an other data object (i.e., D, which was created using data object C, which in turn was created using data objects A and B) then it is not a root of trust but provides sufficient information in its tuple for a user to identify the data object that was used to create E and F and to determine if the data object was trusted (i.e., has a signature associated with it). It also provides sufficient information to determine what data objects were used to create D and, in turn create A and B. Since $R_Y(D)$ is not a root of trust, a user could follow the chain of tuples all the way back to the roots of trust for the data objects used to determine if all of the objects used were trusted (i.e., were signed) and, if so, trust that no modifications were made to the objects after they were created. The present invention either informs a user that all data objects were trusted and not modified after creation or not.

The present invention allows for both in-band (data carried within object payload (e.g., A)) and out of band (data identified by reference (e.g., *A)) transport of the constituent elements. As seen above, for the activity to be allowed to proceed the authorization function must succeed based on the initiating entity, the platform, the data, and the functions used.

The above example illustrates that operations were all cryptographically authorized within and between all associated elements, end-to-end chain of custody to root of trust is achieved, end-to-end data pedigree of composition is preserved throughout the evolution/mutation of the data objects, and end to end authorization of the users, systems, and data objects is achieved.

What is claimed is:

1. A method of multilevel chain of trust/revision, comprising the steps of:
    a) requesting by a first user, via the first user's computing device, certification of a certifiable characteristic;
    b) receiving by a certification authority each certification request from the first user and comparing it against user-definable criteria for certifying the request and, if the criteria are satisfied, issuing to the first user a certificate authorizing the request;
    c) upon issuance of a certificate from the certification authority, contacting by the first user each computing device from which a computer object is required and requesting the computer object;
    d) contacting the certification authority by each computing device that receives a request for a computer object for verification that the first user is authorized to receive the computer object;
    e) for each request for verification, informing the computing device by the certifying authority if the first user is authorized to receive the computer object;
    f) upon receipt by the computing device of verification sending by the computing device the computer object to the first user; and
    upon receipt of the computer object, executing the object, where the result includes a digital certificate for communicating with a subsequent user.

2. The method of claim 1, wherein the step of requesting by a first user, is comprised of requesting digital certification, and wherein the digital certificate includes a digital certificate in accordance with an X.509 standard published by the International Telecommunication Union.

3. The method of claim 1, wherein the step of requesting by a first user certification of a certifiable characteristic includes, requesting computing device authorization, and wherein the computing devices are selected from the group consisting of a computer, a personal digital assistant, and a mobile device.

4. The method of claim 1, wherein the step of requesting by a first user certification of a certifiable characteristic includes, requesting location authorization, where the certifying authority certifies that the first user's computing device is located in an allowable geographical location.

5. The method of claim 1, wherein the step of requesting by a first user certification of a certifiable characteristic includes, requesting computer object authorization, where a computer object is selected from the group of data, software, and a library.

6. The method of claim 1, wherein the step of requesting by a first user certification of a certifiable characteristic includes requesting activity authorization, where the activity is selected from the group consisting of develop program, compile program, distribute program, update program, install program, and execute program.

7. The method of claim 1, wherein the step of requesting by a first user certification of a certifiable characteristic includes requesting circumstance authorization.

8. The method of claim 1, further including the step of associating with each computer object a tuple including the computer object, a pointer to a data structure that indicates what data objects, if any, were used to create the computer object, and a digital signature of the computer object that was signed by a computer platform on which the computer object was created, where the pointer is null if the computer object was created on the computer platform without using another data object with which a tuple is associated.

9. The method of claim 8, wherein the pointer points to a data structure containing a tuple, when the computer object was created using another data object with which a tuple is associated.

10. The method of claim 8, wherein the pointer points to a data structure containing a list of tuples, when the computer object was created using more than one data object with which a tuple is associated.

11. The method of claim 1, wherein said certifiable characteristic is selected from the group consisting of user authorization, computing device authorization, location authorization, access to computer object authorization, activity authorization, circumstance authorization, and communication authorization.

12. The method of claim 1, further comprising the steps of:
  h) contacting the certification authority by the subsequent user and requesting verification that the subsequent user is authorized to process the communication;
  i) upon receipt of verification that the subsequent user is authorized to process the received communication, then providing the subsequent user with a certificate to process the received communication; and
  j) processing the received communication, wherein the processed communication includes all of the certificates associated with each communication providing a chain of trust/revision.

* * * * *